June 29, 1926.

H. BOHL

CATTLE GAP

Filed July 19, 1922

1,590,878

H. Bohl
INVENTOR

BY Victor J. Evans
ATTORNEY

WITNESS:

Patented June 29, 1926.

1,590,878

UNITED STATES PATENT OFFICE.

HUGO BOHL, OF PERSHING, MISSOURI.

CATTLE GAP.

Application filed July 19, 1922. Serial No. 576,077.

This invention relates to improvements in fences, the general object of the invention being to provide a gap in the fence for permitting cattle to pass through but which will prevent the passage of hogs.

Another object of the invention is to so form the parts that there is no danger of the cattle injuring themselves in passing through the device or of their being prevented from passing through it.

The invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1:
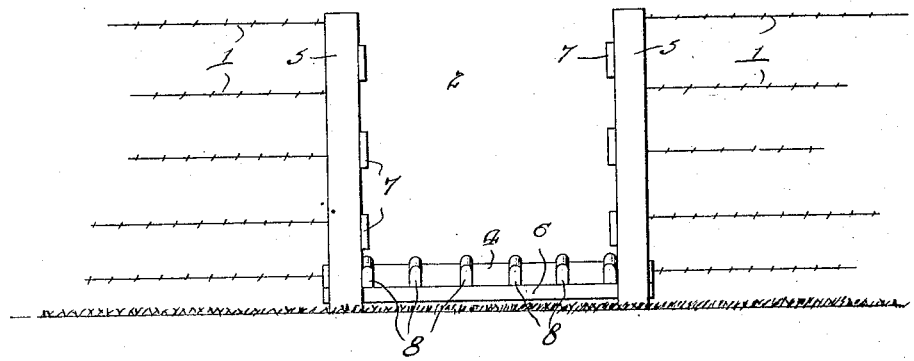
Figure 1 is a view showing a portion of a fence between two fields with my invention in use.
Figure 2:
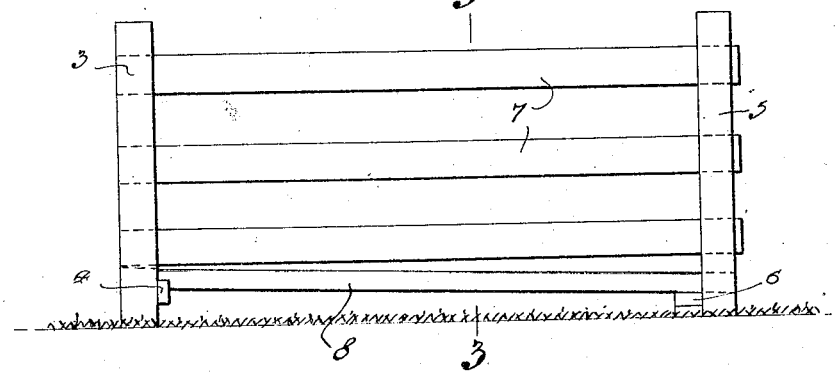
Figure 2 is a side view of the device.
Figure 3:
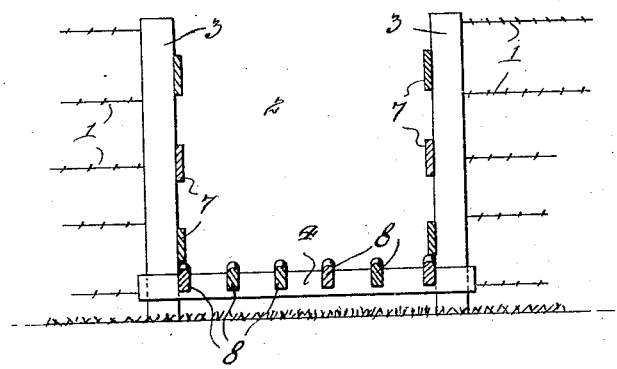
Figure 3 is a section on line 3—3 of Figure 2.

In these views, 1 indicates a fence between two fields. It is the object of this invention to permit cattle to pass from one field to the other, through the fence, but to prevent the passage of hogs as the hogs are to be confined in one field. In carrying out my invention, I form a gap 2 in the fence by placing two posts 3 therein which are spaced apart to form the gap, the wire terminating at the posts. A cross piece 4 has its ends secured to the posts, a distance from the ground and two other posts 5 are placed out from the fence, in the field in which the hogs are to be confined, and the same distance apart as the posts 3. A cross piece 6 is secured to these posts 5 closer to the ground than the cross piece 4, and railings 8 are placed on the cross pieces in spaced relation. Fencing is then secured to the posts 3 and 5, as shown at 7. The railings are spaced a sufficient distance apart to permit the feet and legs of cattle to easily pass between them so that the cattle can walk through the passage or gap and thus pass from one field to the other. The railings have their upper edges rounded to facilitate the cattle placing their feet between the railings. As will be seen, the railings slope upwardly from the piece 6 to the piece 4 so that a hog starting to pass through the gap must straddle the lower end of one of these railings 8 and then as he continues, a higher part of the railing will strike his chest and thus bring him to a stop so that he will have to back out of the gap. By having the railings inclined, the hogs cannot injure themselves and they can always back out of the gap, whereas if the railings were level and at a height sufficient to prevent a hog passing through the gap, a hog might jump into the gap and thus be caught by a railing so that he could not return to the pasture.

It is thought from the foregoing description that the advantages and novel features of my invention will be readily apparent.

I desire it to be understood that I may make changes in the construction and in the combination and arrangement of the several parts, provided that such changes fall within the scope of the appended claim.

Having thus described my invention what I claim is:—

A cattle gap for fences comprising spaced posts in the fence line, a cross piece secured to the posts and raised from the ground, a pair of posts spaced from the fence line, fencing connecting these posts with the first mentioned posts, a cross piece secured to the second pair of posts, spaced railings secured to the cross pieces, the upper edges of said railings being rounded, the second cross piece being lower than the first mentioned cross piece so that the railings are held at an incline.

In testimony whereof I affix my signature.

HUGO BOHL.